United States Patent
Fukumitsu

(10) Patent No.: US 7,319,824 B2
(45) Date of Patent: Jan. 15, 2008

(54) OPTICAL SIGNAL RECEIVER, AND METHOD FOR CONTROLLING IDENTIFICATION POINT FOR BINARIZATION PROCESSING PERFORMED THEREBY

(75) Inventor: Katsumi Fukumitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/152,332

(22) Filed: Jun. 15, 2005

(65) Prior Publication Data

US 2006/0072926 A1    Apr. 6, 2006

Related U.S. Application Data

(63) Continuation of application No. PCT/JP03/007013, filed on Jun. 3, 2003.

(51) Int. Cl.
H04B 10/06 (2006.01)
H04B 10/08 (2006.01)
H04B 17/00 (2006.01)

(52) U.S. Cl. .................. 398/208; 398/202; 398/24; 398/27

(58) Field of Classification Search ............ 398/22, 398/24, 208, 209, 27, 202
See application file for complete search history.

(56) References Cited

U.S. PATENT DOCUMENTS 5,896,391 A * 4/1999 Solheim et al. ............ 714/704

| | | | |
|---|---|---|---|
| 6,463,109 B1 * | 10/2002 | McCormack et al. | 375/355 |
| 6,742,154 B1 * | 5/2004 | Barnard | 714/752 |
| 2001/0030989 A1 | 10/2001 | Arambepola | 375/139 |
| 2004/0028408 A1 * | 2/2004 | Cox et al. | 398/66 |
| 2005/0105919 A1 * | 5/2005 | Sugihara et al. | 398/202 |

FOREIGN PATENT DOCUMENTS

| | | |
|---|---|---|
| JP | 5-291970 | 11/1993 |
| JP | 11-17477 | 1/1999 |
| JP | 2000-151550 | 5/2000 |
| JP | 2001-358790 | 12/2001 |
| JP | 2003-218964 | 7/2003 |

* cited by examiner

*Primary Examiner*—Jason Chan
*Assistant Examiner*—Nathan Curs
(74) *Attorney, Agent, or Firm*—Staas & Halsey LLP

(57) ABSTRACT

A method for controlling an identification point for binarization processing in an optical signal receiver which can diminish a code error rate by optimally tracking an identification point at all times in accordance with a received signal, thereby maintaining transmission quality high. The method comprises identification point electrical signal increment/decrement steps. When the number of error correction operations is determined to have reached a target value in a target value arrival determination step, an identification point electrical signal is left unchanged. In contrast, when the number of error correction operations is determined not to have reached the target value, the identification point electrical signal is incremented or decremented within a predetermined increment/decrement range such that the number of error correction operations approaches the target value.

18 Claims, 10 Drawing Sheets

US 7,319,824 B2

OPTICAL SIGNAL RECEIVER, AND METHOD FOR CONTROLLING IDENTIFICATION POINT FOR BINARIZATION PROCESSING PERFORMED THEREBY

This application is a continuation application, filed under 35 USC 111(a), of International Application PCT/JP2003/007013, filed Jun. 3, 2003.

FIELD OF THE INVENTION

The present invention relates to an optical signal receiver and a method for controlling an identification point for binarization processing performed thereby. Particularly, the present invention relates to an optical signal receiver which can optimally determine an identification point regardless of an eye pattern and can optimally determine an identification point without mixing an error in transmission data during an in-service period, as well as to a method for controlling an identification point for binarization processing performed by the optical signal receiver.

An optical transmission system starting with a submarine optical relay transmission system is in currently seeing increases in transmission capacity and transmission distance. A wavelength-multiplexed transmission system which multiplexes a larger number of signals is introduced for addressing an increase in transmission capacity. Furthermore, an error correcting code having high correcting capability is inplemented for preventing an increase in the number of code errors due to the increase in transmission distance.

FIG. 7 shows an example wavelength-multiplexed submarine optical transmission system which focuses attention on a signal transmitted in one direction. The wavelength-multiplexed submarine optical transmission system is most appropriate for illustration, in view that the system performs optical transmission constituting the principal transmission scheme of digital communication, performs wavelength-multiplexing for increasing capacity, and inplements error correcting code having high correcting capability.

However, it is pointed out that the area of application for the present invention is not limited to the wavelength-multiplexed submarine optical transmission system or to the optical transmission system; the present invention can also be applied to any digital transmission system, regardless of any transmission scheme.

In the wavelength-multiplexed submarine optical transmission system 100 shown in FIG. 7, a transmission-end terminal device 110A and a receiving-end terminal device 110B are coupled together by way of an optical fiber 105a and a submarine relay 105B. A frame of STM-64 is transmitted, while remaining multiplexed, at a rate of about 12 Gb/s (gigabits/sec.) from the transmission-end terminal device 110A to the receiving-end terminal device 110B.

The transmission-end terminal device 110A comprises "n" ("n" is an integer, equal to two or more) transmission conversion sections 101-1 to 101-n, amplifiers 102-1 to 102-n, a wavelength-multiplexing section 103, and a transmission amplifier 104.

The transmission conversion sections 101-1 to 101-n are transmission converters which receive an optical signal modulated by the frame of STM-64 format and temporarily convert the thus-received signal into an electrical signal. Further, the transmission converters 101-1 to 101-n add a service bit, such as an error correcting code or the like, to the electrical signal, thereby generating a signal of 12 Gb/s; modulate the optical signal with the signal of 12 Gb/s; and output the thus-modulated optical signal. All of the optical signals output from the transmission converters 101-1 to 101-n differ in wavelength from each other.

The amplifiers 102-1 to 102-n are amplifiers which amplify the optical signals output from the respective transmission conversion sections 101-1 to 101-n. An optical fiber amplifier using an erbium-ion-doped optical fiber is usually used for each of the amplifiers.

The wavelength-multiplexing section 103 subjects optical signals, which are output from the respective amplifiers 102-1 to 102-n and have different wavelengths, to wavelength-multiplexing. The transmission amplifier 104 amplifies the wavelength-multiplexed optical signals from the wavelength-multiplexing section 103. An optical fiber amplifier using erbium-ion-doped optical fiber is usually used for the transmission amplifier 104.

The submarine relay 105 compensates for an attention of an optical signal in the optical transmission channel laid in the sea floor. An optical fiber amplifier using erbium-ion-doped optical fiber is usually used for the submarine relay 105b.

The receiving-end terminal device 110B comprises a receiving amplifier 106, a wavelength separation section 107, amplifiers 108-1 to 108-n, and receiving conversion sections 109-1 to 109-n.

The receiving amplifier 106 amplifies the transmitted optical signal. An optical fiber amplifier using erbium-ion-doped optical fiber is usually used for the receiving amplifier 106. The wavelength separation section 107 demultiplexes the wavelength-multiplexed transmitted optical signal into the original optical signals of respective wavelengths. The thus-output optical signals of respective wavelengths are modulated by an electrical signal of 12 Gb/s.

The amplifiers 108-1 to 108-n are amplifiers for amplifying the demultiplexed optical signals of respective wavelengths. An optical fiber amplifier using erbium-ion-doped optical fiber is usually used for the amplifiers.

The receiving conversion sections 109-1 to 109-n are receiving converters which temporarily convert the optical signals, into which the electrical signals of 12 Gb/s are modulated, into the electrical signals; and which eliminate the service bit from the electrical signals by subjecting the electrical signals to error correction, to thus output the optical signals modulated with the frame of STM-64 format.

The respective receiving conversion sections 109-1 to 109-n are provided with identification circuits which convert the input optical signals into electrical signals corresponding to the intensity thereof, and which demodulate the digital signals of 12 Gb/s modulated by a change in intensity with respect to the time axis. The identification accuracy of the identification circuit is used as a conclusive index for evaluating transmission quality.

BACKGROUND TECHNIQUE

FIG. 8 is a block diagram showing an example configuration of the respective receiving conversion sections 109-1 to 109-n in the conventional receiving-end terminal device 110B shown in FIG. 7. In the receiving conversion section 109 shown in FIG. 8, reference numeral 111 designates a preamplifier (AMP) for amplifying an optical signal modulated by an input electrical signal of 12 Gb/s; and 112 designates an optical/electrical (O/E: Optical/Electrical) interface section which converts the optical signal output from the preamplifier 111 into an electrical signal and outputs an electrical signal of 12 Gb/s. The previously-described identification circuit is disposed within the O/E interface section 112.

Reference numeral 113 designates a demultiplexer (DMUX: De-Multiplexer) which decomposes the electrical signal of 12 Gb/s output from the optical/electrical interface section 112 into 16 electrical signals of 751 Mb/s; and 114 designates a serial/parallel converter (S/P: Serial/Parallel) for converting the 16 electrical signals of 751 Mb/s into 64 electrical signals of 178 Mb/s.

Moreover, reference numeral 115 designates an error correcting decoder (FEC, DEC: Forward-acting Error Correcting code, Decoder) for correcting errors for each signals of 178 Mb/s output from the serial/parallel converter 114.

Reference numeral 116 designates a speed converter (SPD CONV: Speed Converter) for converting a 12 Gb/s-based frame format into an STM-64-based frame format, outputs 64 electrical signals of 155 Mb/s.

Reference numeral 117 designates a parallel/serial converter (abbreviated as P/S in the drawing) for converting 64 electrical signals of 155 Mb/s into 16 electrical signals of 621 Mb/s; 118 designates an electrical/optical converter (abbreviated as E/O in the drawing) for modulating the 16 electrical signals of 621 Mb/s with an optical signal; 119 designates a processor (MP: Maintenance Processor) for managing monitoring and control of the receiving conversion section 109; and 120 designates a control buffer (BUFF: Buffer) which collects the number of error codes from the error correcting decoder 115 in response to a command from the processor 119, thereby providing a response.

FIG. 9 is a block diagram showing an example configuration of the above-described conventional optical/electrical interface 112. The optical/electrical interface section 112 comprises a photodiode (Photodiode: PD) 121, an amplifier 122, an equalizer (EQL) 123, a timing extraction section (TIM) 124, a D-flip flop (D-FF) 125, and a reference voltage holding section 126.

The photodiode 121 receives the optical signal (the optical signal having been subjected to wavelength demultiplexing) output from the AMP 111 shown in FIG. 8 and outputs an electrical signal (a voltage signal) having an amplitude value corresponding to the intensity of the optical signal. The amplifier 122 amplifies the electrical signal output from the photodiode 121.

The equalizer 123 subjects the electrical signal amplified by the amplifier 122 to equalization processing. The timing extraction section 124 extracts, from the electrical signal output from the amplifier 122, a timing component used for extracting a modulated signal component in a subsequent stage, and outputs the extracted timing component as a clock signal.

The D-flip flop 125 compares the signal output from the equalizer 123 as a data signal with the fixed voltage value held by the reference voltage holding section 126, and outputs a signal corresponding to the result of comparison in synchronism with the clock signal output from the timing extraction section 124.

The optical signal received by the photodiode 121 is formed as a result of amplitude modulation of the data signal of 12 Gb/s in any of the transmission conversion sections 101-1 to 101-n of the transmission-end terminal device 110A. The above-described D-flip flop 125 can demodulate the thus-modulated signal and output the thus-demodulated signal as a digital signal.

Consequently, the D-flip flop 125 is arranged to take an identification point determined by the voltage held by the reference voltage holding section 126 and the phase of the clock signal output from the timing extraction section 124, and to output a digital (digitized) signal consisting of a "1" or "0" logic level in synchronism with the clock signal. Thus the D-flip flop 125 is configured as an identification circuit which demodulate the digital signal of 12 Gb/s modulated by a change in intensity with respect to the time axis.

FIGS. 10A and 10B are views showing a relationship between a waveform of the data signal (voltage signal) input to the above-described D-flip flop 125 and the identification point I. In the drawing, the horizontal axis denotes time, and the vertical axis denotes amplitude. As shown in FIGS. 10A and 10B, the identification point I is determined by the fixed voltage value held by the reference voltage holding section 126 and the phase of the clock signal output from the timing extraction section 124.

The maximum amplitude level corresponds to a logic level 1, and the minimum amplitude level corresponds to a logic level 0. Since there is a chance of the logic level of the transmitted information changing during a duration of one bit corresponding to a transmission speed, there exists a point at which the logic level is switched every duration of one bit. An area surrounded by the logic level of 1, the logic level of 0, and a transient state achieved before and after the switching point is called an eye pattern.

In reality, the eye pattern becomes narrow because the logic level of 1, the logic level of 0, and the transient state achieved before and after the switching point change on a per-bit basis. FIG. 10(*a*) shows the eye pattern acquired in an appropriate condition, and FIG. 10(*b*) shows the eye pattern acquired when the transmission signal has undergone deterioration or the like.

In the case of the eye pattern such as that shown in FIG. 10(*a*), the D-flip flop 125 can perform identification processing of a received waveform with high accuracy even when the fixedly-set identification point voltage is used, and hence the code error rate is minimized during identification, so that the transmission quality becomes maximum.

In contrast, as shown in FIG. 10(*b*), when fluctuations have arisen in the loss of the transmission channel or in the gain of the optical fiber amplifier, the amplitude of the received waveform has become smaller than that which is achieved in a condition shown in FIG. 10(*a*). When the fixedly-set identification point voltage I is used, difficulty is encountered by the D-flip flop 125 in carrying out identification operation with high accuracy, thereby deteriorating the code error rate and obstructing an improvement in transmission quality.

Put another way, as a result of pursuit of an increase in transmission distance and capacity of the optical communications system, the received signal that has been transmitted and input to the receiver is subjected to fluctuations for reasons of various fluctuation factors from short-term and long-term points of view. As a result, the optimum identification point of the signal identification circuit in the receiver also similarly fluctuates.

In other words, although the identification circuit 125 of the above-described receiving-end terminal device 110B in the wavelength-multiplexed optical transmission system uses the identification point set the voltage to a fixed value, it is desired to change the voltage of the identification point according to a transmission characteristic in order to minimize the code error in the demodulation.

Alternatively, in the wavelength-multiplexed optical transmission system, the gain of the optical fiber amplifier has wavelength dependence. Although there is a technique for lessening the wavelength dependence through use of a variable optical equalizer, equalization residues are accumulated with an increase in the number of stages of the optical fiber amplifiers in the long-distance transmission channel, so that variations in the level of the code, which arise on a per-wavelength basis, are unavoidable. Consequently, in such a case, each receiving converter must be controlled to a different identification point and make the identification processing.

The present invention has been conceived in view of such a drawback and aims at providing an optical signal receiver and a method for controlling an identification point for binarization processing performed thereby, wherein a code error rate is diminished by optimally tracking an identification point at all times in accordance with a received signal, thereby maintaining transmission quality high.

DISCLOSURE OF THE INVENTION

In order to achieve the object, a method for controlling an identification point for binarization according to the present invention relates to a method for controlling an identification point for binarization in an optical signal receiver, the receiver including a photoelectric conversion section which receives an optical signal into which a data signal is modulated with a frame format and converts the optical signal into an electric signal corresponding to the intensity of the optical signal, a binarization processing section which compares the electric signal output from the photoelectric conversion section with a predetermined identification point electric signal, to thus output the electric signal as binarized digital data, and a demodulation processing section for demodulating, from the digital data output from the binarization processing section, frame information into which an optical signal received by the photoelectric conversion section is modulated, by means of performing frame capture operations and error correction operations, the method comprising: an error correction count acquisition step for acquiring the number of error correction operations performed by the demodulation processing section; a capture error determination step for determining whether or not a capture error has arisen during frame capture operation performed by the demodulation processing section; a target value arrival determination step for determining whether or not the number of error correction operations performed by the demodulation processing section has reached a target value when the capture error is determined not to have arisen in the capture error determination step; an identification point electrical signal increment/decrement step for leaving the identification point electrical signal unchanged when the number of error correction operations is determined to have reached a target value but incrementing or decrementing the identification point electrical signal within a predetermined increment/decrement range in such a way that the number of error correction operations approaches the target value when the number of error correction operations is determined not to have reached the target value; and an increment/decrement range reduction step for curtailing an increment/decrement range for incrementing or decrementing the identification point electrical signal in the identification point electrical signal increment/decrement step when the capture error has arisen.

Moreover, the identification point electrical signal increment/decrement step can also be configured to comprise: an error correction count comparison step of comparing the number of error correction operations acquired in the current iteration with the number of error correction operations acquired in the last iteration in the error correction count acquisition step; an incrementing/decrementing direction determination step of leaving unchanged a direction in which the identification point is incremented or decremented when the number of error correction operations acquired in the current iteration is smaller than the number of error correction operations acquired in the last iteration in the error correction count step and of reversing a direction in which the identification point electrical signal is incremented or decremented when the number of error correction operations acquired in the current iteration is larger than the number of error correction operations acquired in the last iteration; a computation step of performing computation for incrementing or decrementing the identification point electrical signal by a predetermined unit quantity of increment/decrement, in accordance with the incrementing/decrementing direction determined in the incrementing/decrementing direction determination step; and a limit value processing step of reversing the direction in which the identification point electrical signal is incremented or decremented when the identification point electrical signal has reached a limit value within the increment/decrement range as a result of computation of the identification point electrical signal in the computation step.

In this case, a determination may be made as to a case where the capture error has arisen and a case where no capture error has arisen in the capture error determination step, by means of providing a protection stage for each case.

Furthermore, in the capture error determination step, the capture error can be determined to have arisen when information showing occurrence of the capture error is received a first predetermined number of times from the demodulation processing section; and the capture error can also be determined not to have arisen when information showing nonoccurrence of the capture error is received a second predetermined number of times.

The increment/decrement range may be held in the maximum range which can be assumed by the electrical signal output from the photoelectric conversion section, until the number of times information showing nonoccurrence of the capture error is received reaches a second predetermined number of times in the capture error determination step.

Further, control of the identification point for binarization may be stopped on the basis of an external alarm signal.

Moreover, an optical signal receiver of the present invention is characterized by comprising: a photoelectric conversion section which receives an optical signal into which a data signal is modulated with a frame format and converts the optical signal into an analog electric signal corresponding to the intensity of the optical signal; a binarization processing section which compares the analog electric signal output from the photoelectric conversion section with a predetermined identification point electric voltage, to thus output the analog electric signal as binarized digital data; a demodulation processing section for demodulating, from the digital data output from the binarization processing section, frame information into which an optical signal received by the photoelectric conversion section is modulated, by means of performing frame capture operations and error correction operations; and a tracking control section which receives an input of information about the frame capture error output from the demodulation processing section and an input of information about the number of times the error correction operation is performed and which controls tracking of the identification point voltage in the binarization processing section.

Consequently, the present invention yields an advantage of the ability to diminish a code error rate and maintain transmission quality high by means of optimally tracking an identification point at all times in accordance with a received signal through processing performed by a tracking control section; that is, an error correction count acquisition step, a capture error determination step, a target value arrival determination step, an identification point electrical signal increment/decrement step, and an increment/decrement range reduction step.

BEST MODES FOR IMPLEMENTING THE INVENTION

An embodiment of the present invention will be described hereinbelow by reference to the drawings.

Figure 1:
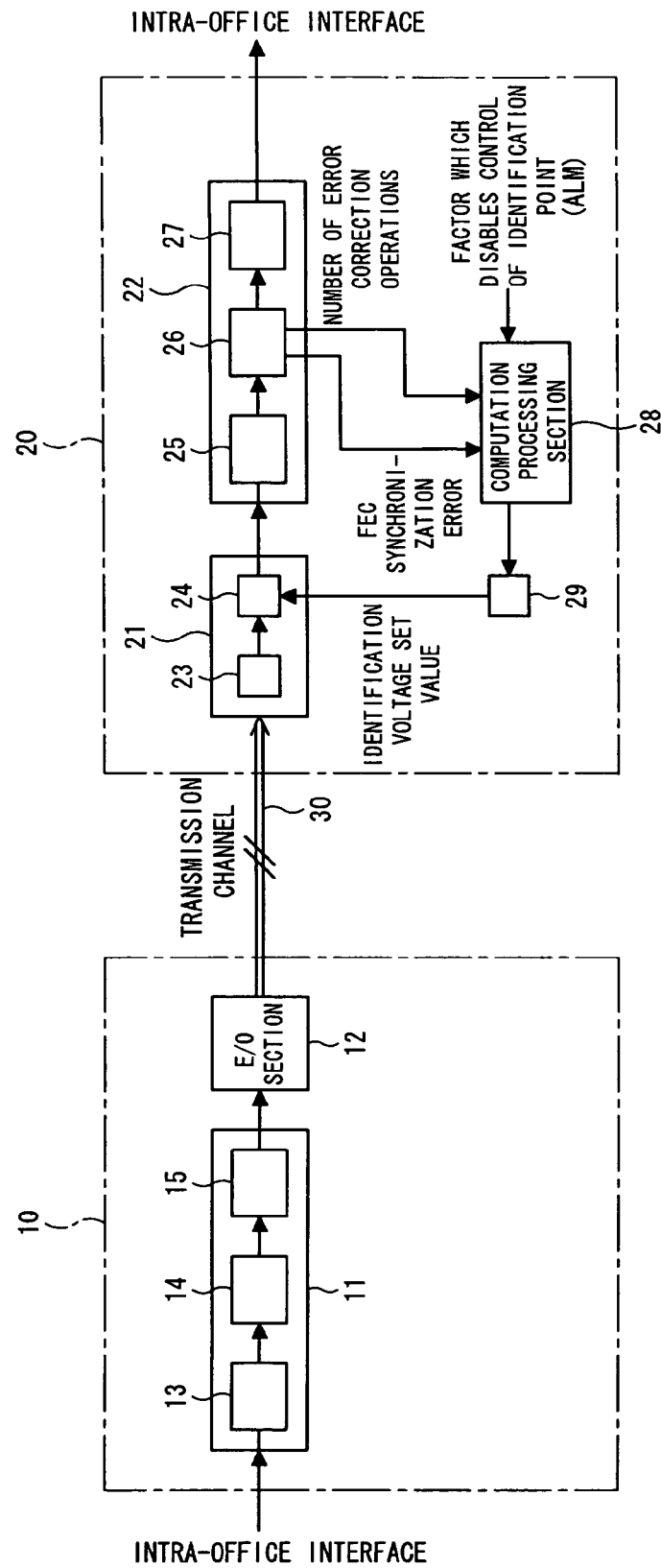
FIG. 1 is a block diagram showing an optical transmission system according to an embodiment of the present invention.

FIG. 1 is a block diagram showing an optical transmission system 1 according to an embodiment of the present invention. The optical transmission system 1 shown in FIG. 1 focuses attention on, particularly, improved exchange of an optical signal between a transmission converter and a receiving converter, which corresponds exchange of an optical signal between a transmission converter 101-1 to 101-n and a receiving converter 109-1 to 109-n shown in FIG. 7. Namely, the optical transmission system 1 shown in FIG. 1 is configured to transmit an optical signal formed by modulating data with light of specific wavelength by the transmission converter 10, and receive it in the receiving converter 20, and the receiving converter 20 outputs the received optical signal as a demodulated data signal.

Figure 7:
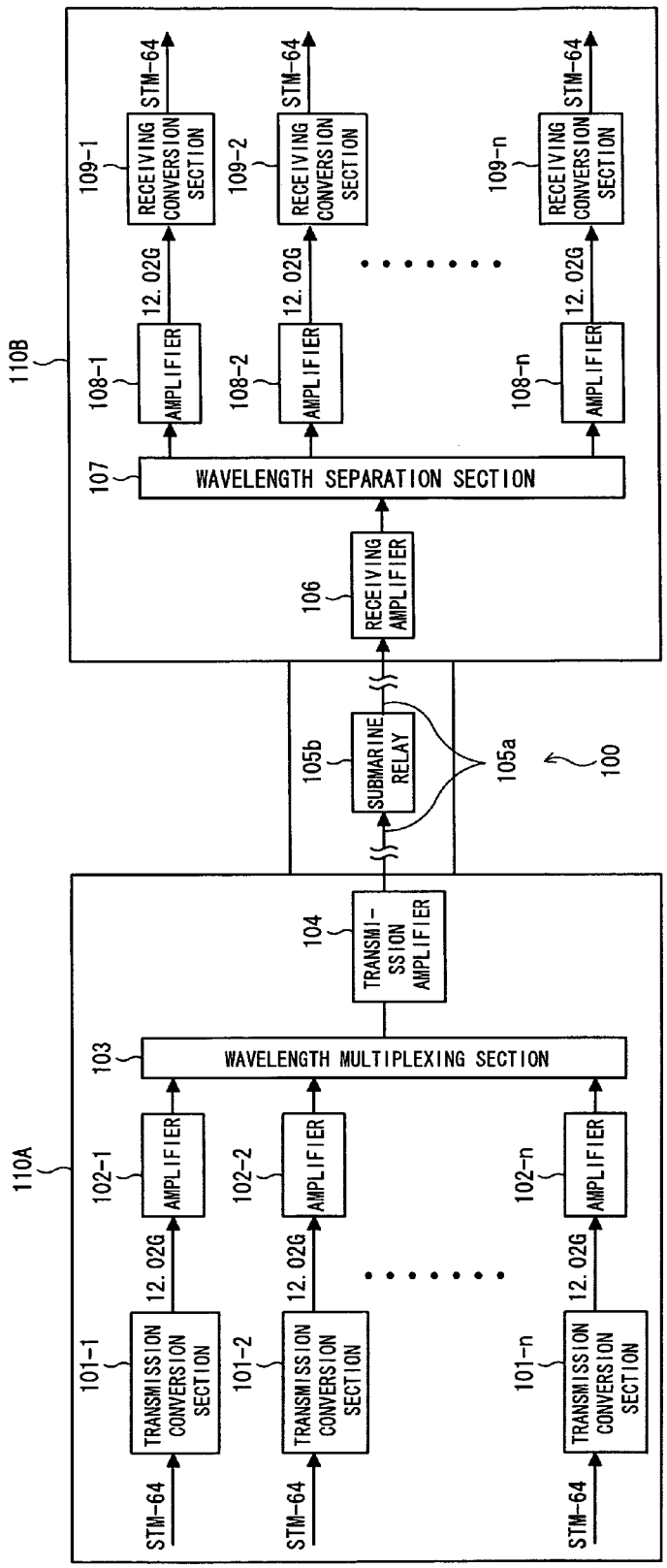
FIG. 7 is a view showing, as a background technique of the present invention, an example wavelength-multiplexed submarine optical transmission system which focuses attention on a signal transmitted in one direction.

In connection with the optical transmission system 1 shown in FIG. 1, the amplifiers 102-1 to 102-n shown in FIG. 7, the wavelength-multiplexing section 103, the transmission amplifier 104, the receiving amplifier 106, the wavelength separation section 107, and the amplifiers 108-1 to 108-n shown in FIG. 7 are omitted from the drawings. A transmission channel consisting of an optical fiber 105a and a submarine relay 105b is illustrated as a transmission channel 30.

The transmission converter 10 shown in FIG. 1 is constituted of an electrical circuit section 11 including a first signal conversion section 13, an FEC encoding section 14, and a second signal conversion section 15; and an E/O section 12.

The first signal conversion section 13 outputs, as serial signals, frame signals formed by converting speeds of STM-64 signals, or the like, input in parallel from the plurality of unillustrated channels of intra-office interfaces. The FEC encoding section 14 adds service bits, such as error correction codes or the like, to the frame signals output from the first signal conversion section 13. The second signal conversion section 15 multiplexes the frame signals output from the FEC encoding section 14, to thus produce, e.g., a signal of 12 Gb/s.

The E/O section 12 modulates the light of predetermined wavelength with the signal of 12 Gb/s generated by the second signal conversion section 15 of the electrical signal section 11 and outputs the thus-modulated light. As mentioned previously, the modulated optical signal is subjected to wavelength-multiplexing, and is transmited as thus-wavelength-multiplexed optical signals through the transmission channel 30.

The receiving converter 20 shown in FIG. 1 comprises an O/E section 21 which converts an optical signal (after having been subjected to wavelength separation) of 12 Gb/s transmitted over the transmission channel 30 into an electorical signal, an electrical circuit section 22, a computation processing section 28, and a digital-to-analog conversion section 29.

Figure 2:
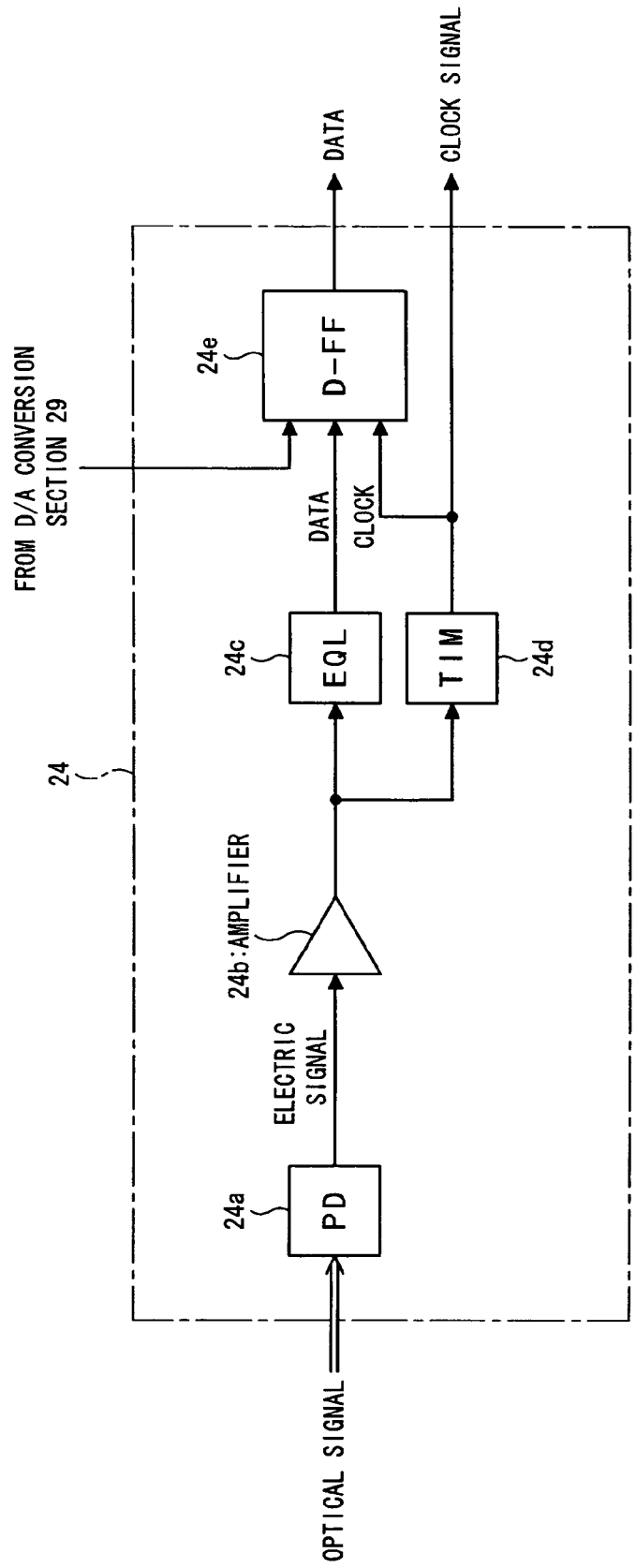
FIG. 2 is a block diagram showing an optical/electrical interface section according to one embodiment of the present invention.
Figure 8:
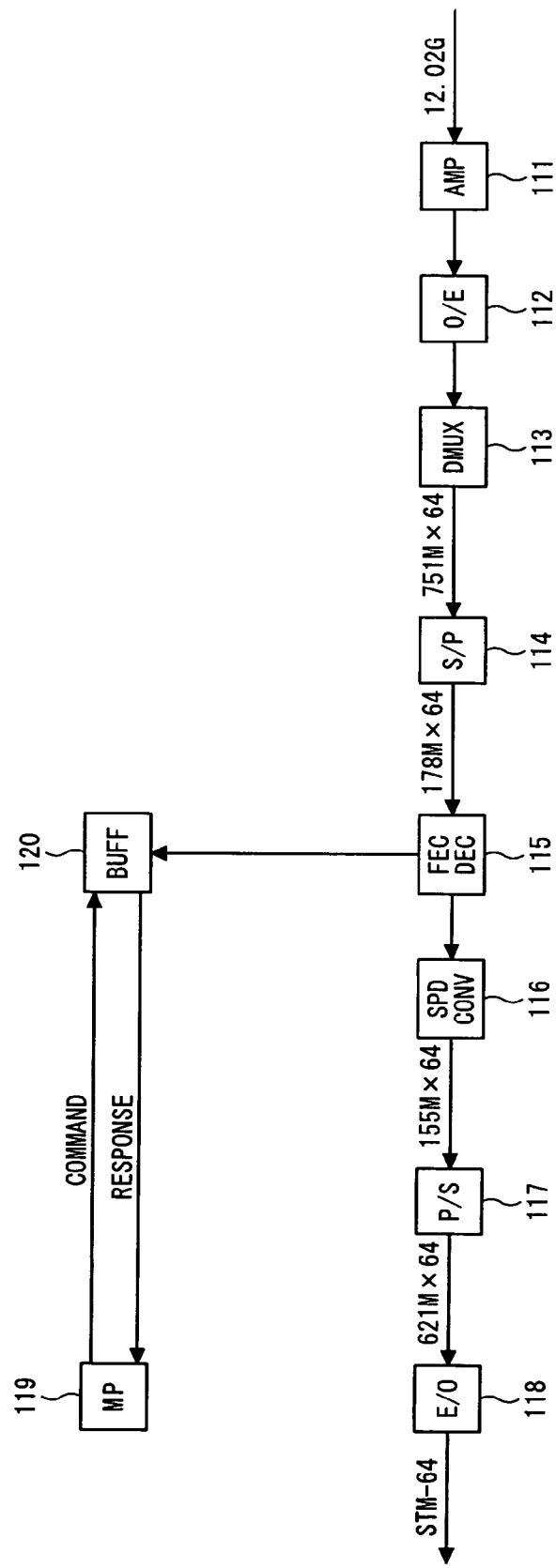
FIG. 8 is a block diagram showing an example configuration of each receiving converter shown in FIG. 7.

The O/E section 21 has an AMP 23 and an optical/electrical interface 24, which relates to those (see reference numerals 111, 112) shown in FIG. 8. FIG. 2 shows the detailed configuration of the optical/electrical interface section 24.

Figure 9:
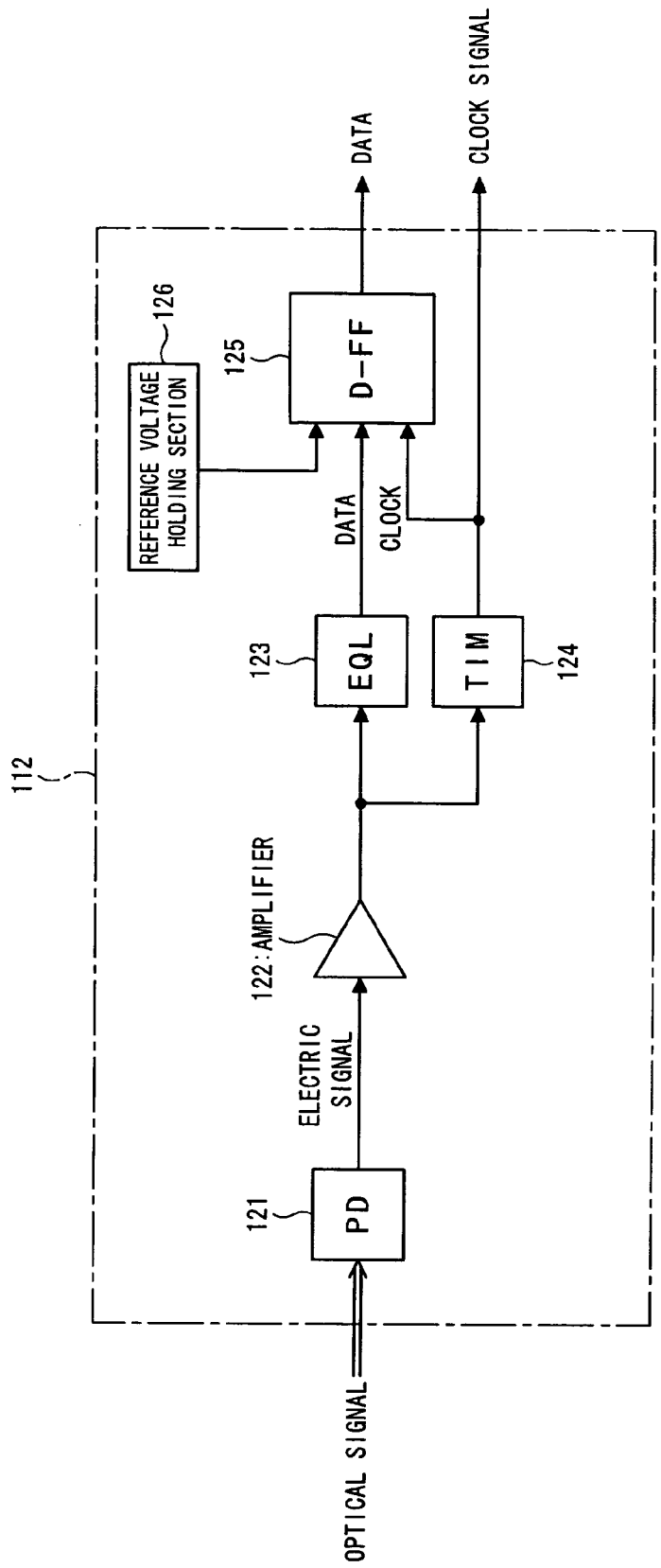
FIG. 9 is a block diagram showing the principal section of the receiving converter shown in FIG. 8.
Figure 10A:
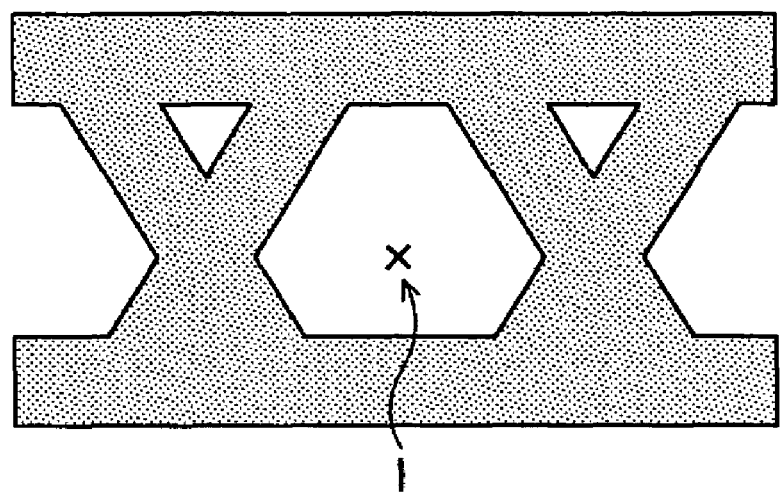
FIGS. 10(a) and 10(b) are views for describing a problem to be solved by the present invention.
Figure 10B:
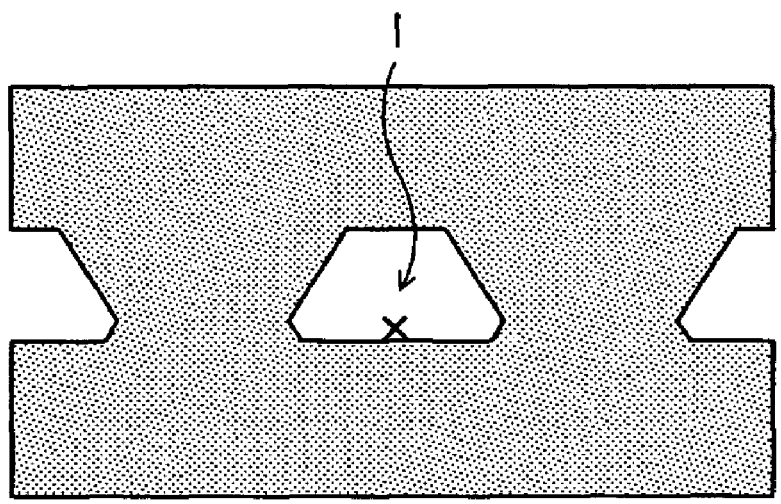

The optical/electrical interface section 24 has a photodiode (PD) 24a, an amplifier 24b, an equalizer (EQL) 24c, and a timing extraction section (TIM) 24d, which function in substantially the same manner as those shown in FIG. 9 (see reference numerals 121 to 124). Further, the optical/electrical interface section 24 has a D-flip flop (D-FF) 24e which outputs a binarized signal under the control characterizing the present invention.

Specifically, the D-flip flop 24e receives a set voltage value (digital value) output from the digital-to-analog conversion section 29, which will be described later. When the amplitude value of the signal input, as data, from the equalizer 24c is greater than the set voltage value, a signal of "1" is output in synchronism with the clock signal output from the timing extraction section 24d. When the amplitude value of the signal input, as data, from the equalizer 24c is smaller than the set voltage value, a signal of "0" is output in synchronism with the clock signal output from the timing extraction section 24d.

Put another way, the D-flip flop 24e takes, as an identification point, a point determined by a phase difference existing between the set voltage output from the digital-to-analog conversion section 29, the electrical signal input as data from the equalizer 24c, and the clock signal output from the timing extraction section 124, and outputs a binarized signal consisting of a logic level 1 or 0.

Therefore, the previously-described photodiode 24a functions as a photoelectric conversion section which receives an optical signal, into which a data signal is modulated with a frame format of 12 Gb/s, and converts the thus-received signal into an electrical signal (a voltage signal having an amplitude value corresponding to the intensity of the optical signal) Moreover, the equalizer 24c, the timing extraction section 24d, and the D-flip flop 24e function as a binarization processing section which compares the electrical signal received from the photodiode 24a with a predetermined identification point electrical signal thereby outputting a result of comparison as binarized digital data.

The electrical circuit section 22 converts the frame forming the electrical signal converted by the O/E section 21 into a signal (e.g., an STM-64 signal) addressed to an unillustrated intra-office interface. The electrical circuit section 22 comprises a third signal conversion section 25, an FEC synchronization/demodulation processing section 26, and a fourth signal conversion section 27.

The third signal conversion section 25 separates the binarized digital signal output from the optical/electrical conversion interface section 24 of the o/E section 21 and converts the serial signal into a parallel signal. The third signal conversion section has the same functions as those of the DMUX 113 and the S/P 114, which are shown in FIG. 8.

The FEC synchronization/demodulation processing section 26 has basically the same function as that of the previously-described error code correction device 115 shown in FIG. 9. The FEC synchronization/demodulation processing section 26 functions as a demodulation processing section which receives the digital data output from the binarization processing section by way of the third signal conversion section 25 and which demodulates, from the digital data, the frame information modulated into the optical signal received by the photodiode 24a, by means of performing frame capture operation and error correction operation.

The number of times the FEC synchronization/demodulation processing section 26 has performed error correction operation is stored in a buffer 29. When an error of frame synchronization has arisen in the FEC synchronization/demodulation processing section 26, occurrence of the error is output to the computation processing section 28.

Moreover, the fourth signal conversion section 27 converts the speed of the frame information output from the FEC synchronization/demodulation processing section 26 and converts a serial signal into a parallel signal. The fourth signal conversion section has the same function as those of the SPD CONV 116 and the P/S 117, both of which are shown in FIG. 8.

The computation processing section 28 receives, as inputs, information about an error in capturing a frame output from the FEC synchronization/demodulation processing section 26 and information about the number of times the FEC synchronization/demodulation processing section 26 has performed error correction. On the basis of these pieces of information, the computation processing section 28 performs tracking control of an identification point voltage used by the D-flip flop 24e of the optical/electrical interface section 24, and acts as a tracking control section.

The computation processing section 28 may be constituted of, e.g., a microprocessor which is operated by software or is constituted to operate by means of firmware or hardware.

The digital-to-analog conversion section 29 converts into an analog signal the identification point voltage signal (digital signal) output for tracking control from the computation processing section 28. The D-flip flop 24e uses the identification point voltage signal converted into the digital signal as a threshold voltage for binarization processing, so that the electrical signal input as data can be output as a binarized digital signal.

Figure 3:
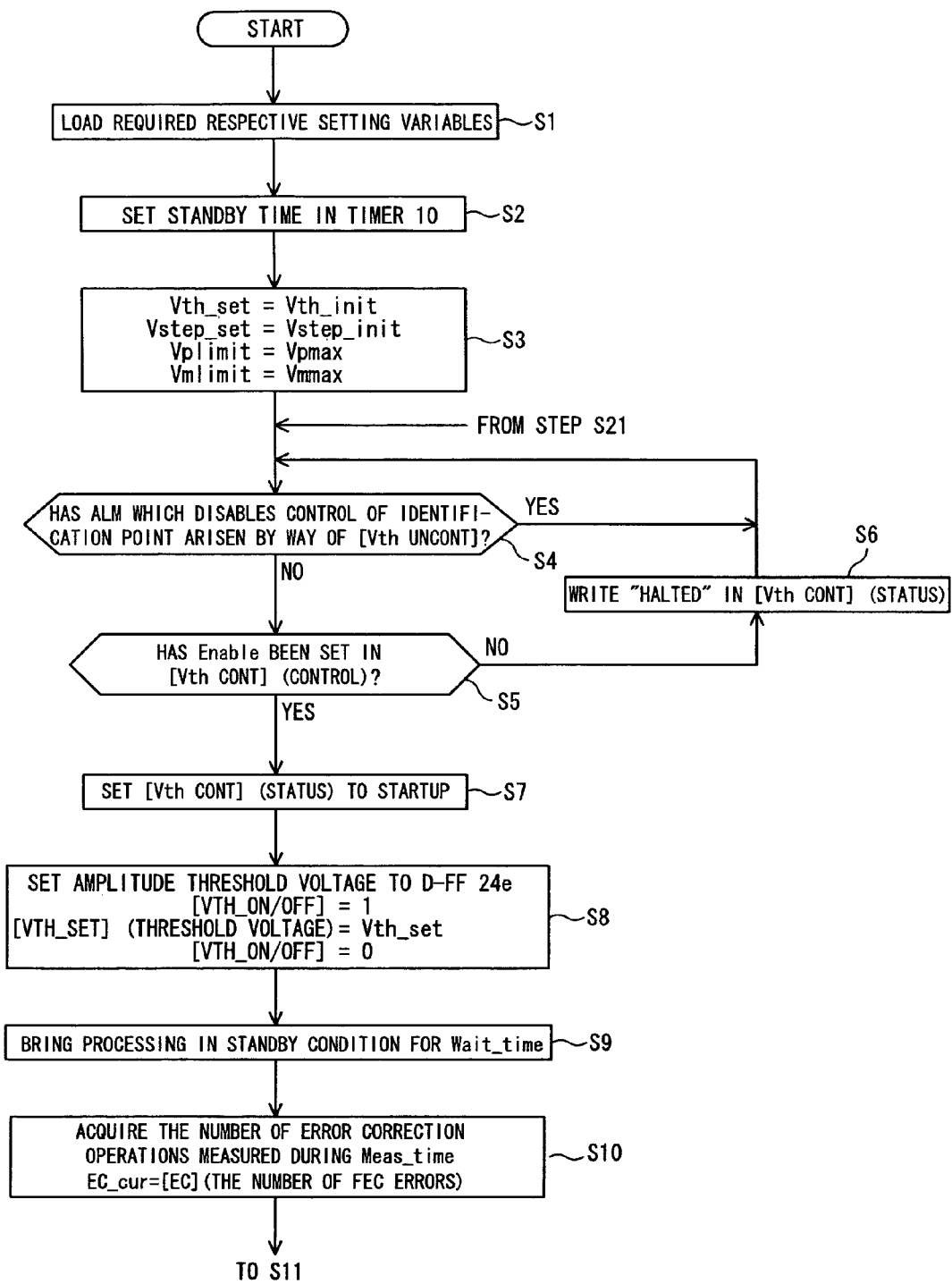
FIGS. 3 through 5 are flowcharts for describing tracking control of an identification point voltage performed by a computation processing section.
Figure 4:
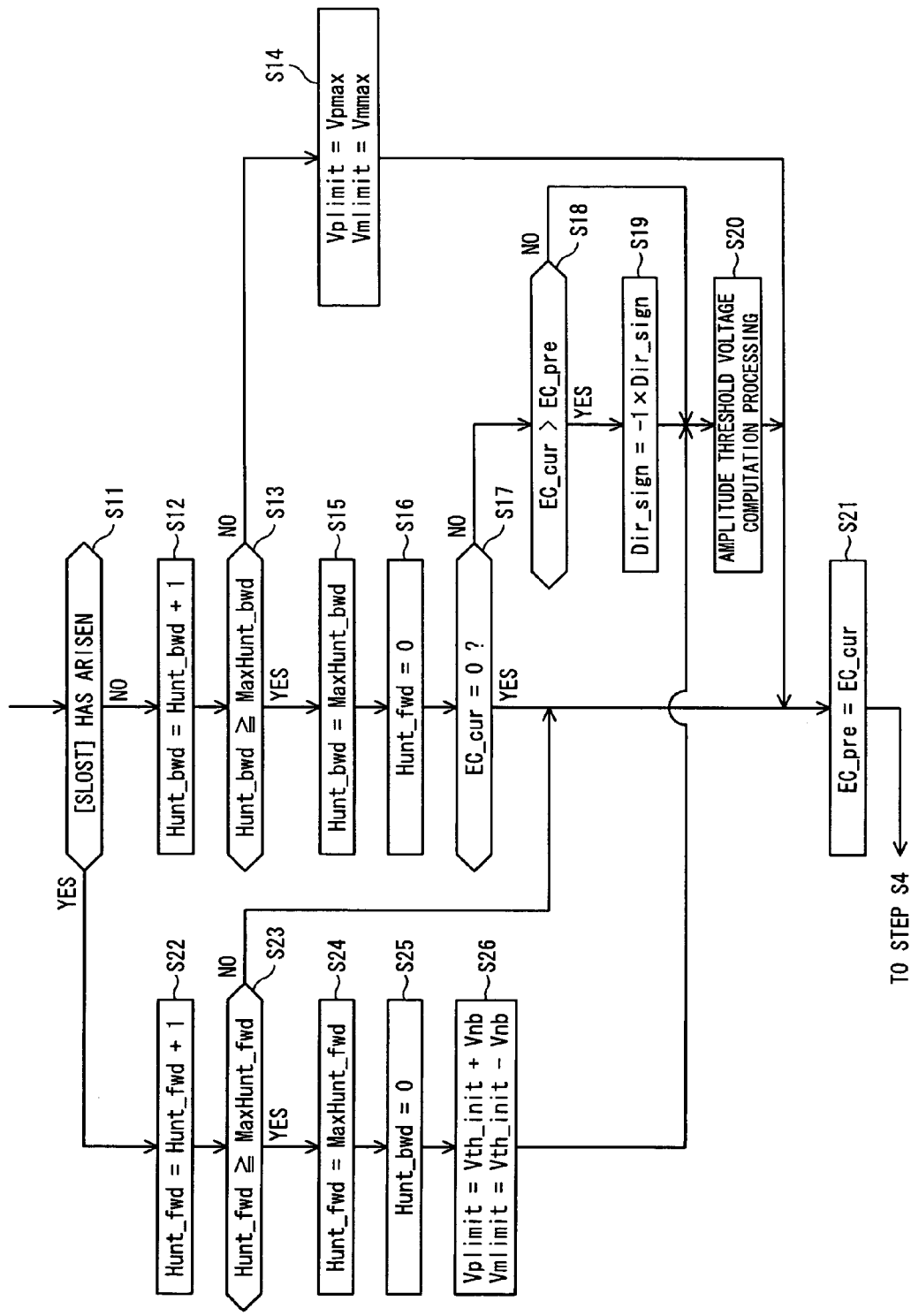
Figure 5:
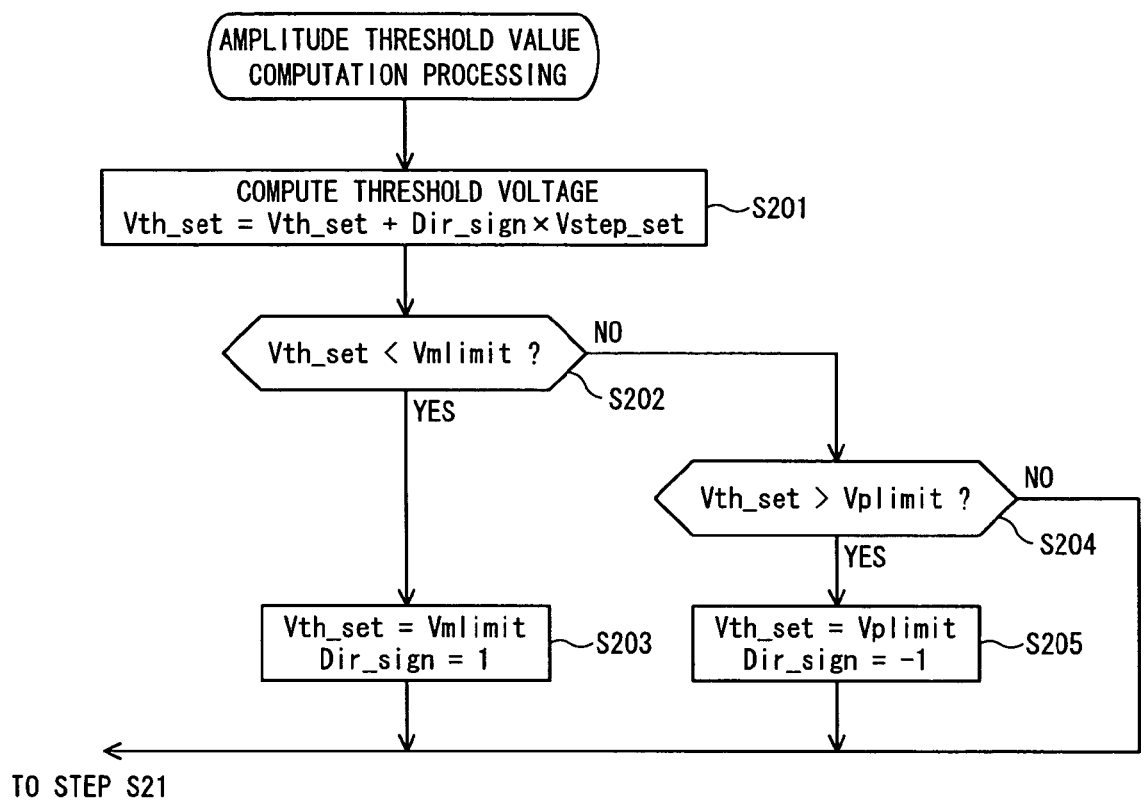

FIGS. 3 through 5 are flowcharts for describing tracking control of an identification point voltage. In the following description, a control mode of the computation processing section 28 will be pursued in accordance with the flowchart. When effecting the following tracking control, the computation processing section 28 reads/writes data and a command through use of I/O registers Vth CONT, Vth UNCONT, SLOST, VTH_ON/OFF, VTH_SET, and EC.

Vth CONT is for reporting Enable/Disable pertaining to control of an identification point by means of reading operation and start/stop pertaining to control of an identification point by means of writing operation. Vth UNCONT is for reporting an alarm indicating that control of an identification point is impossible. SLOST is for reporting an error of FEC frame synchronization. VTH_ON/OFF is a key flag for setting an amplitude threshold voltage (an identification point voltage) in the D-flip flop 24e. VTH_SET is for outputting the value of an amplitude threshold voltage, and EC is for reporting the number of corrected FEC errors.

First, after power for activating the receiving converter 20 has been turned on, variables Vth_set, Vstep_set, Vplimit, and Vmlimit for computation processing of the computation processing section 28 are subjected to initial setting as initial operation (step S2). After lapse of a wait time (e.g., ten seconds or thereabouts) for warming up set by a variable Timer 10 (step S3), the computation processing section 28 automatically starts control operation.

When the computation processing section 28 is constituted of a microprocessor which is operated as a result of running of software, information about all of the variables used by the computation processing section 28 has been loaded from a storage device in advance of setting the variables for computation processing (step S1).

Vth_set is a set value of the identification point voltage (an amplitude threshold voltage) required at the time of computation processing performed by the computation processing section 28. At the time of initial setting, Vth_set is set to Vth_init (e.g., 128) set as an initial value of Vth_set. On the assumption that the minimum value of an amplitude which can be output as data by the equalizer 24c is 0 and that the maximum value of the same is 265, Vth_init can be arbitrarily set within the range of 0 to 265.

Vstep_set is a set value of a step width employed for setting an amplitude threshold value. Specifically, Vstep_set indicates the unit quantity of increment/decrement used when the identification point voltage is incremented or decremented. At the time of initial setting, Vstep_set is set to Vstep_init (e.g., 1) set as an initial value of Vth_step. In this case, Vstep_init can be arbitrarily set within a range of 0 to 20.

Figure 6A:
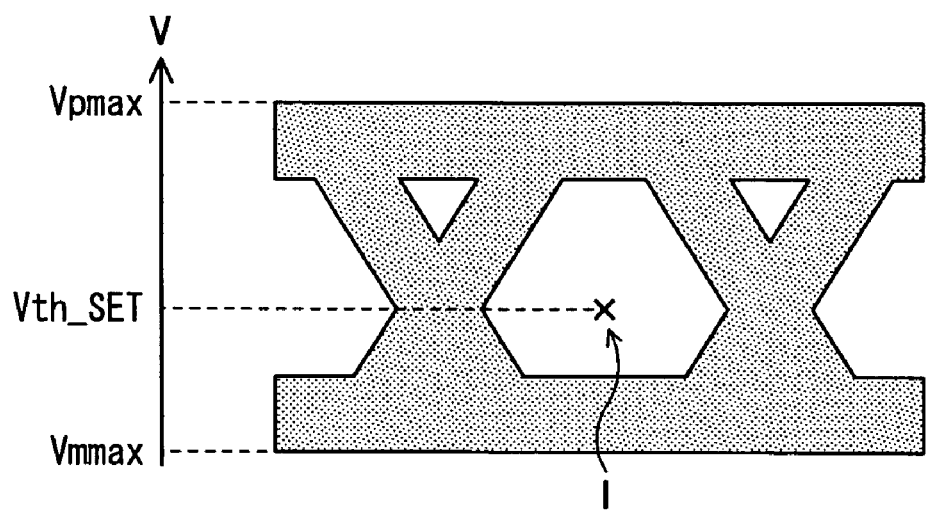
FIGS. 6(a) and 6(b) are views for describing a working-effect induced by control of an identification point for binarization processing according to the embodiment.

Moreover, Vplimit is a set limit value of a positive amplitude threshold voltage. At the time of initial setting, Vpmax (265 in this case), which is the maximum positive amplitude threshold voltage, is set. Provided that the amplitude value of Vpmax "265" is taken as the positive maximum value of the amplitude of the signal input as data into the D-flip flop 24e, the amplitude threshold voltage (an identification point voltage) Vth_SET can be decreased down to a value Vpmax or thereabouts, as shown in FIG. 6(a) to be described later.

Similarly, Vmlimit is a set limit value of a negative amplitude threshold value. At the time of initial setting, Vmmax (0 in this case), which is the maximum negative amplitude threshold voltage, is set. Provided that the amplitude value of Vmmax "0" is taken as the negative maximum value of the amplitude of the signal input as data into the D-flip flop 24e, the amplitude threshold voltage (the identification point voltage) Vth_SET can be decreased down to a value Vmmax or thereabouts, as shown in FIG. 6(a) to be described later.

The Timer 10 set as a wait time for warming up the above-described system can be arbitrarily set to an integral value within the range of 10 to 20.

When the above-described four variables are initially set, tracking control of the amplitude threshold voltage is initiated. At this time, when an alarm signal is input from the outside, control of an identification point for binarization processing is stopped on the basis of the alarm signal.

For example, upon receipt of an alarm of the type which affects tracking control performed by the computation processing section 28, such as disconnection of an input of high-order optical signal; more specifically, when an alarm, such as that mentioned above, is issued by way of the I/O register Vth UNCONT in the computing processing section 28, the current amplitude threshold voltage Vth_set is retained, and control operation is stopped (when YES is selected in step S4).

In a situation where the above-described alarm is not issued (or the alarm has been stopped), when a Disable order has been received from an MPTR (Maintenance Processor for Tributary) by way of an NMS (Network Management System); more specifically, when "Disable" is reported by way of the I/O register Vth CONT, the current threshold value is retained until an Enable command is received from the MPTR, and control operation is stopped (from NO in step S4 to step S5, and from NO in step S5 to step S6).

When the alarm issued in step S4 is recovered and when the Enable command is reported from the MPTR (Enable is set in the I/O register Vth CONT), tracking control is resumed from the currently-held amplitude threshold voltage value Vth_set is (NO in step S4, and YES in step S5 to step S7). At this time, the I/O register Vth CONT showing the status of the computation processing section 28 is set to "STARTUP."

When the computation processing section 28 is performing tracking control, "STARTUP" is written into the I/O register Vth CONT showing the status of the computation processing section 28. The status of startup continues to be reported to the MPTR, which is a higher-level machine, by way of an NMS: Craft Terminal/SSE (System Surveillance Equipment) or the like. During stoppage of tracking control, "HALTED" is written into the I/O register Vth CONT.

As mentioned above, when tracking control is initiated, the I/O register VTH_SET used for outputting an amplitude threshold voltage to the analog-to-digital conversion section 29 is set, whereby the amplitude threshold voltage is set to the D-flip flop 24e (step S8).

Specifically, the I/O register Vth_ON/OFF, which is a key flag for setting the amplitude threshold voltage (an identification point voltage) to the D-flip flop 24e, is set to "1" (a flag indicating that output of an amplitude threshold voltage is enabled). Subsequently, the amplitude threshold voltage Vth_set set in the computation processing section 28 is set to the I/O register VTH_SET, and the I/O register Vth_ON/OFF is returned to "0" (a flag indicating that output of the amplitude threshold voltage is disabled).

As a result, the digital-to-analog conversion section 29 can read the amplitude threshold voltage (the digital signal) set in the previously-described I/O register VTH_SET, convert the digital signal into an analog signal, and output the analog signal to the D-flip flop 24e.

After having output the above-described amplitude threshold voltage VTH_SET, the computation processing section 28 remains in a standby condition for a period of time set as Wait_time, which is a time for stabilizing an error arising immediately after setting of a change in amplitude threshold voltage (step S9). Subsequently, the computation processing section 28 acquires the number of corrected errors measured during a period of measurement time set as Meas_time from the I/O register EC. The computation processing section 28 uses the number of corrected errors as a variable EC_cur for computation processing in a subsequent stage (step S10).

In other words, step S10 forms the error correction count acquisition step for acquiring the number of times error correction operation is performed by the FEC synchronization/demodulation processing section 26.

In relation to the wait time set as Wait_time, "1," for instance, can be set as an initial value. However, in the present embodiment, the wait time can also be set to an integral value within a range of 0 to 10. Moreover, in relation to the measurement time set as Meas_time, "1," for instance, can be set as an initial value. However, in the present embodiment, the measurement time can be set to an integral value within a range of 0 to 10 or values which increase from 0 to 1 in increments of 0.1.

After the computation processing section 28 has set the number of corrected errors as EC_cur, the FEC synchronization/demodulation processing section 26 reads a value for reporting an error of FEC frame synchronization from the I/O register SLOST. A protection stage is set for determining whether a synchronization error has arisen (i.e., a capture error has arisen) or synchronization is achieved (i.e., no capture error has arisen) (step S11).

The term "protection stage" used herein indicates the processing function of the computation processing section 28 for determining whether the FEC synchronization error has arisen or the FEC synchronization is achieved, by means of reading the specified number of operations for reading I/O data as well as reading I/O data indicating one FEC synchronization error or synchronized FEC.

As will be described later, when a synchronized determination has reached a specified number of times, the amplitude threshold voltage is caused to proceed in the current direction (backward protection), as will be described later. However, when the number of FEC synchronization errors has exceeded a specified number of protection counts, the amplitude threshold voltage is forcefully caused to proceed in the currently-specified direction, which is called "hunting" (forward protection).

Specifically, every time the computation processing section 28 reads from the I/O register SLOST information indicating that synchronization is achieved (nonoccurrence of SLOST), a value of 1 is added to the value of Hunt_bwd (an initial value thereof is 0), thereby counting the number of times the computation processing section 28 determines that FEC synchronization is achieved (from NO in step S11 to step S12).

In short, the variable Hunt_bwd is set for a hunting backward protection counter. Processing for computing the amplitude threshold value Vth_set is not performed until the number of times synchronization is achieved, which is shown by Hunt_bwd; that is, the number of times "synchronized state" is read from the I/O register SLOST, has become equal to or greater than the maximum value MaxHunt_bwd (step S13).

In other words, when the information showing that a capture error has not arisen is received in the number of MaxHunt_bwd serving as a second predetermined number of times, the computation processing section 28 determines that no capture error has arisen. The above-described MaxHunt_bwd can be set to, e.g., 10. However, in the present embodiment, an arbitrary value within the range of 0 to 266 can be set.

Similarly, every time information indicating an FEC synchronization error (occurrence of SLOST) is read from the I/O register SLOST, the computation processing section 28 adds a value of 1 to the value of Hunt_fwd (from an initial value of 0). Thus, the computation processing section 28 counts the number of times occurrence of an FEC synchronization error is determined (from YES in step S11 to step S22).

The variable Hunt_fwd is set as a hunting forward protection counter. Processing for narrowing a range in which the amplitude threshold voltage is incremented or decremented is not performed until the number of times a synchronization error is determined, which is shown by Hunt_fwd; that is, the number of times "FEC synchronization is achieved" is read from the I/O register SLOST, has become equal to or greater than the maximum value MaxHunt_fwd (step S23).

Put another way, when the information showing a capture error is received in the number of MaxHunt_fwd serving as a first predetermined number of times, the computation processing section 28 determines that a capture error has arisen. The above-described MaxHunt_fwd can be set to, e.g., 20. However, in the present embodiment, an arbitrary value within the range of 0 to 266 can be set.

Consequently, steps S11 to S13, S22, and S23 constitute a capture error determination step for determining whether or not an FEC synchronization error, which is a capture error, has arisen, through the frame capture operation performed by the FEC synchronization/demodulation processing section 26.

When the information indicating that synchronization is achieved is reported by the I/O register SLOST, the value of Vplimit and that of Vmlimit are maintained at corresponding maximum values Vpmax and Vmmax until Hunt_bwd becomes equal to or greater than MaxHunt_bwd (from NO in step S13 to step S14). The EC_cur set in the computation processing section 28 is set to the error correction count EC_pre measured in the last iteration (step S21), and processing returns to the original control sequence (from step S21 to step S4).

Figure 6B:
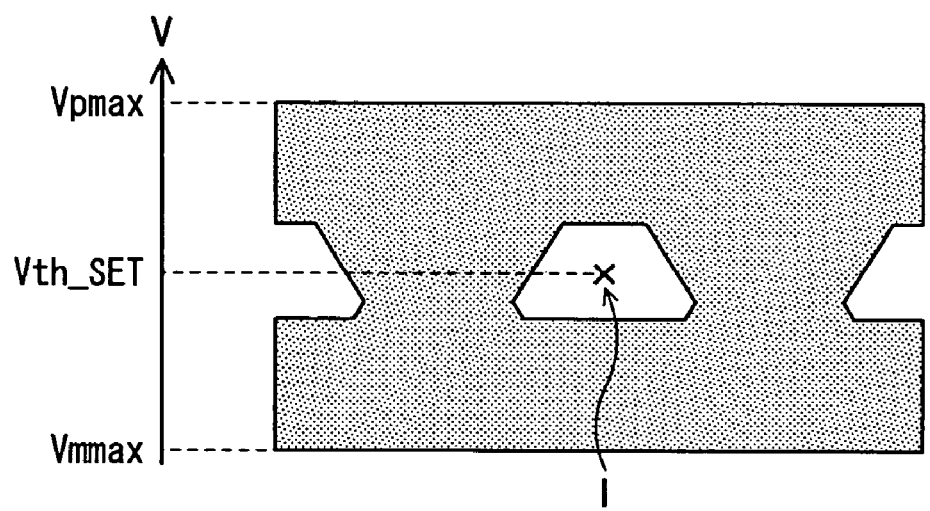

Specifically, the range of increment/decrement of the identification point voltage defined by the value of Vmlimit and the value of Vplimit is maintained at the maximum range (the range defined by the value of Vmmax and the value of Vpmax [see FIGS. 6(a) and 6(b), which will be described later]) which can be assumed by the electrical signal output from the photodiode 24a, until the number of times the information indicating that no capture error has arisen is received reaches MaxHunt_bwd serving as a second predetermined count.

Namely, processing returns to a sequence for acquiring the number of corrected errors (steps S7 to S10) while referring to the I/O registers Vth UNCONT and Vth CONT which serve as criteria for determining whether to make tracking control continue or stop (steps S4, S5), by use of the identification voltage value (an analog value corresponding to Vth_SET) set in the D-flip flop 24e.

When Hunt_bwd has become equal to the maximum value MaxHunt_bwd or more, Hunt_bwd is set to the value of MaxHunt_bwed (from YES in step S13 to step S15), and the above-described variable Hunt_fwd is set to 0 (step S16).

Subsequent to processing for setting Hunt_bwd to MaxHunt_bwd, processing for incrementing/decrementing the threshold set voltage shown below is performed on the basis of whether or not the number of corrected errors acquired in step S10 has come to 0 (step S17).

Therefore, when the capture error is determined not to have arisen through capture error determination steps S11 to S13, step S17 constitutes a target value arrival determination step for determining whether or not the number of error correction operations measured by the FEC synchronization/demodulation processing section 26 has reached a target value for control (0 in the embodiment).

Namely, when the number of corrected errors assumes 0, the EC_cur set in the computation processing section 28 is set to the number of corrected errors EC_pre measured in the last iteration (from YES in step S17 to step S21), and processing returns to the original control sequence (from step S21 to step S4). In contrast, when the number of corrected errors does not assume 0, processing for incrementing or decrementing the set threshold voltage is performed (NO in step S17).

At this time, the number of corrected errors acquired in one iteration is compared with that acquired in another iteration as processing for incrementing/decrementing the set threshold voltage. Specifically, a determination is made as to whether the number of corrected errors EC_cur measured in the current iteration is greater or smaller than the number of corrected errors EC_pre measured in the previous iteration (step S18; an error correction count comparison step).

When the number of corrected errors EC_cur measured in the current iteration is smaller than the number of corrected errors EC_pre measured in the previous iteration, control of the amplitude threshold voltage is considered to be heading in a correct direction. The set threshold voltage is incremented (or decremented) in accordance with an incrementing/decrementing direction set by Dir_sign (from NO in step S18 to step S20).

When the number of corrected errors EC_cur measured in the current iteration is greater than the number of corrected errors EC_pre measured in the previous iteration, control of the amplitude threshold voltage is considered to be heading in an incorrect direction. The incrementing/decrementing direction set by Dir_sign is inverted (from YES in step S18 to step S19), thereby incrementing (or decrementing) the set threshold voltage (step S20).

Consequently, when the number of corrected errors EC_cur measured in the current iteration is determined, in error correction count comparison step S18, to be smaller than the number of corrected errors EC_pre measured in the previous iteration, step S19 functions as an incrementing/decrementing direction determination step for leaving unchanged the direction in which the identification point electric signal is incremented or decremented. In contrast, when the number of corrected errors EC_cur measured in the current iteration is determined to be greater than the number of corrected errors EC_pre measured in the previous iteration, step S19 functions as an incrementing/decrementing direction determination step for inverting the direction in which the identification point electric signal is incremented or decremented.

A value of +1 can be set as an initial value for the above-described Dir_sign. However, in this state of an initial value, Vth_set is incremented by only a step width Vstep_set through threshold value computation processing. When the code is inverted to −1, Vth_set is decremented (or incremented in the negative direction) by only the step width Vstep_set through threshold value computation processing.

FIG. 5 is a flowchart for describing a threshold value computation processing for incrementing (decrementing) the set threshold voltage in step S20. As shown in FIG. 5, the incremented (or decremented) amplitude threshold voltage Vth_set is computed by computing Equation (1) provided below, through use of Vth_set, Dir_sign, and Vstep_set set forth (step S201). As indicated by Equation (1), the originally-computed Vth_set has changed from the original Vth_set by Vstep_set, and the direction of change is determined by the symbol of Dir_sign.

$$Vth\_set = Vth\_set + Dir\_sign \times Vstep\_set \quad (1)$$

Consequently, step S201 functions as a computation step for incrementing or decrementing the identification point electrical signal by only a predetermined unit quantity in accordance with the incrementing/decrementing direction determined in the incrementing/decrementing direction determination step S19.

A determination is made as to whether or not the thus-computed Vth_set has exceeded the maximum amplitude threshold value which can be taken as Vth_set. When Vth_set has exceeded (in a negative direction) the maximum value Vmlimit of the negative amplitude threshold voltage which can be taken as Vth_set, the set threshold value Vth_set is taken as the maximum Vmlimit. The direction in which Vth_set is changed is changed from a decrementing direction to an incrementing direction through threshold value computation processing, by means of changing Dir_sign from −1 to +1 (from YES in step S202 to step S203).

In contrast, when Vth_set has exceeded (in a positive direction) the maximum value Vplimit of the positive amplitude threshold voltage which can be taken as Vth_set, the set threshold voltage Vth_set is taken as the maximum value Vplimit. The direction in which Vth_set is changed is changed from an incrementing direction to a decrementing direction through threshold value computation processing, by means of changing Dir_sign from +1 to −1 (NO in step S202, and from YES in step S204 to step S205).

When Vth_set has not exceeded the above-described positive maximum amplitude threshold voltage value Vplimit (in the positive direction) and has not exceeded the negative maximum amplitude threshold voltage value Vmlimit (in the negative direction), the sign of Dir_sign is left unchanged. The direction in which Vth_set is changed is not changed (NO in step S204).

Therefore, when the identification point electrical signal has assumed the limit value within the increment/decrement range as a result of computation of the identification point electrical signal in computation step S201, steps S202 to S205 described above function as limit value processing steps for inverting the direction in which the identification point electrical signal is incremented or decremented.

As mentioned above, when Vth_set is computed and the sign of Dir_sign used for computing the next Vth_set is determined (step S203, NO in S204, and S205), EC_cur set in the computation processing section 28 is set as the number of corrected errors EC_pre measured in the previous iteration (step S21), and processing returns to the original control sequence (from step S21 to step S4).

As a result, when the number of error correcting operations is determined to have reached a target value of 0 in target value arrival determination step S17, steps S18 to S21 subsequent to step S17 function as identification point electrical signal incrementing/decrementing steps for leaving the identification point electrical signal unchanged. When the number of error correcting operations is determined not to have reached the target value in target value arrival determination step S17, steps S18 to S21 subsequent to step S17 function as identification point electrical signal incrementing/decrementing steps for incrementing/decrementing the identification point electrical signal within the predetermined increment/decrement range such that the number of error correcting operations approaches the target value of 0.

Incidentally, when tracking control of the amplitude threshold voltage is automatically initiated from the time of activation of power of the system, the set threshold voltage Vth_set is incremented or decremented, from steps S4 to S21, in a direction in which the number of corrected errors is minimized, within the range of Vmlimit or Vplimit set as an initial value, unless an alarm or an FEC synchronization error arises in step S4 or S5. When the FEC synchronization error has risen in excess of the protection stage, Vmlimit or Vplimit is changed such that the range where the above-described set threshold voltage Vth_set is incremented or decremented.

When the FEC synchronization error is reported by the I/O register SLOST (YES in step S11), EC_cur set in the computation processing section 28 is set to the number of corrected errors EC_pre measured in the last iteration (step S21) until the FEC synchronization error exceeds the protection stage; that is, until when Hunt_fwd exceeds the value of MaxHunt_fwd (step S22, NO in step S23), and processing returns to the original control sequence (from step S21 to step S4).

Moreover, when the FEC synchronization error has exceeded the protection stage; that is, when Hunt_fwd has become equal to the maximum value MaxHunt_fwd or more, Hunt_fwd is set to the value of MaxHunt_fwd (from YES in step S23 to step S24), and the above-described variable Hunt_bwd is set to 0 (step S25).

The maximum positive amplitude threshold voltage Vplimit used in steps S202, S204 is set to a value determined by adding Vnb to the initial amplitude threshold voltage Vth_init, and the maximum negative amplitude threshold voltage Vmlimit is set to a value determined by subtracting Vnb from the initial amplitude threshold voltage Vth_init (step S26). Here, Vnb designates a narrow bandwidth limitation of the amplitude threshold voltage. In this case, 26 can be set. In addition, an arbitrary number within a range of 0 to 120 can be set. When Vnb is set to 26, Vplimit assumes a value of 153 and Vmlimit assumes a value of 103, because Vth_init assumes a value of 128.

Therefore, when the FEC synchronization error, which is taken as a capture error, is determined to have arisen in capture error determination step S11, step S26 serves as an increment/decrement range reduction step for reducing the increment/decrement range for incrementing or decrementing the identification point electrical signal in identification point electrical signal increment/decrement steps S18 to S21.

Processing for computing an amplitude threshold voltage (see step S20, steps S201 to S205 in FIG. 5) similar to that mentioned previously is performed through use of the value of Vplimit and that of Vmlimit changed in the previously-described manner. The amplitude threshold voltage Vth_SET can be incremented or decremented within a range of Vmlimit 103 to Vplimit 153. As mentioned above, the range which the amplitude threshold voltage can assume is restricted, whereby immediate recovery of synchronization from the synchronization error is expected.

Even when synchronization has recovered from the FEC synchronization error, the probability of recovery is unknown, for reasons of a limitation on the range which such an amplitude threshold value can assume. The amplitude threshold voltage is caused to proceed in an unchanged manner in the current direction until the determination indicating that synchronization is achieved reaches a specified number of times (backward protection, NO in step S13). However, measured error values in iterations are not compared with each other (i.e., EC_cur is not compared with EC_pre). When the determination has exceeded the specified number of protection counts, error values measured in one iteration are compared with error values measured in another iteration in steps Sl9, S20, thereby shifting the amplitude threshold voltage.

The set variables Vth_init, Vstep_init, Vnb, MaxHunt_fwd, MaxHunt_bwd, Meas_time, and Timer 10 used in the previously-described computation processing section 28 can be handled as being readily changed during debugging, and final values of the variables are not determined until completion of debugging.

By means of the above-described configuration, the optical signals transmitted from the transmission converter 10 are subjected to wavelength-multiplexing, and transmitted through the transmission channel 20. The thus-transmitted optical signals are received by the receiving converter 20 after having been subjected to wavelength separation. Since this receiving converter 20 can cause the computation processing section 28 to increment/decrement the amplitude threshold voltage, which serves as an identification voltage, at all times so as to track the number of corrected errors, the identification point voltage Vth_SET can be incremented or decremented at all times such that the number of corrected errors is reduced. For instance, even when an optical signal having an eye pattern, which is achieved in normal times and is shown in FIG. 6(a), is input or when the optical signal has become an optical signal having an eye pattern, which is achieved as a result of occurrence of deterioration of a signal and is shown in FIG. 6(b), the identification point I can be set in an area where an overlap between signal components is small in the drawing.

The present inventor has ascertained, through a simulation test, that the code error rate can be reduced by tracking control of the amplitude threshold value performed by the computation processing section 28, such as that mentioned previously.

As mentioned above, one embodiment of the present invention yields an advantage of the ability to reduce a code error rate and maintain transmission quality high by means of optimally tracking an identification point at all times in accordance with a received signal through processing performed by the computation processing section 28 (steps S1 to S26) serving as a tracking control section.

As in the case of the present embodiment, an identification point, which changes from one receiving converter to another (from one wavelength to another wavelength), can be controlled and identified by applying tracking control of an identification point of a received signal according to the present invention to a receiving-end device of a wavelength-multiplexed optical transmission system. Even when variations have arisen at a code level of each wavelength for reasons of a gain wavelength dependence of an optical fiber amplifier, the code error rate can be diminished, and transmission quality can be maintained high.

Regardless of the above-described embodiment, the present invention can be carried out while being modified in various manners within the scope of the present invention.

A person skilled in the art can manufacture the system on the basis of the disclosure of the embodiments of the present invention.

INDUSTRIAL APPLICABILITY

As has been described, the optical signal receiver and the method for controlling an identification point for binarization processing, both pertaining to the present invention, are useful when binarized digital data are output by comparing identification point electrical signals of received signals with each other. Particularly, the receiver and the method are suitable for processing of a received signal performed by an optical signal receiver in an optical transmission system, such as a submarine optical relay transmission system.

What is claimed is:

1. A method for controlling an identification point for binarization in an optical signal receiver, the receiver including a photoelectric conversion section which receives an optical signal into which a data signal is modulated with a frame format and converts the optical signal into an electric signal corresponding to the intensity of the optical signal, a binarization processing section which compares the electric signal output from the photoelectric conversion section with a predetermined identification point electric signal, to thus output the electric signal as binarized digital data, and a demodulation processing section for demodulating, from the digital data output from the binarization processing section, frame information into which an optical signal received by the photoelectric conversion section is modulated, by means of performing frame capture operations and error correction operations, the method comprising:

an error correction count acquisition step for acquiring the number of error correction operations performed by said demodulation processing section;

a capture error determination step for determining whether or not a capture error has arisen during frame capture operation performed by said demodulation processing section;

a target value arrival determination step for determining whether or not the number of error correction operations performed by said demodulation processing section has reached a target value when said capture error is determined not to have arisen in said capture error determination step;

an identification point electrical signal increment/decrement step for leaving said identification point electrical signal unchanged when said number of error correction operations is determined to have reached a target value but incrementing or decrementing said identification point electrical signal within a predetermined increment/decrement range in such a way that said number of error correction operations approaches said target value when said number of error correction operations is determined not to have reached said target value; and an increment/decrement range reduction step for curtailing an increment/decrement range for incrementing or decrementing said identification point electrical signal in said identification point electrical signal increment/decrement step when said capture error has arisen.

2. The method for controlling an identification point for binarization in an optical signal receiver according to claim 1, wherein said identification point electrical signal increment/decrement step comprises an error correction count comparison step of comparing the number of error correction operations acquired in a current iteration with the number of error correction operations acquired in a last iteration in said error correction count acquisition step;

an incrementing/decrementing direction determination step of leaving unchanged a direction in which said identification point is incremented or decremented when said number of error correction operations acquired in the current iteration is smaller than said number of error correction operations acquired in the last iteration in said error correction count step and of reversing a direction in which said identification point electrical signal is incremented or decremented when said number of error correction operations acquired in the current iteration is larger than said number of error correction operations acquired in the last iteration;

a computation step of performing computation for incrementing or decrementing said identification point electrical signal by a predetermined unit quantity of increment/decrement, in accordance with said incrementing/decrementing direction determined in said incrementing/decrementing direction determination step; and a limit value processing step of reversing said direction in which said identification point electrical signal is incremented or decremented when said identification point electrical signal has reached a limit value within said increment/decrement range as a result of computation of said identification point electrical signal in said computation step.

3. The method for controlling an identification point for binarization in an optical signal receiver according to claim 1, wherein a determination is made as to a case where said capture error has arisen and a case where no capture error has arisen in said capture error determination step, by means of providing a protection stage for each case.

4. The method for controlling an identification point for binarization in an optical signal receiver according to claim 2, wherein a determination is made as to a case where said capture error has arisen and a case where no capture error has arisen in said capture error determination step, by means of providing a protection stage for each case.

5. The method for controlling an identification point for binarization in an optical signal receiver according to claim 3, wherein, in said capture error determination step, said capture error is determined to have arisen when information showing occurrence of said capture error is received a first predetermined number of times from said demodulation processing section; and said capture error is determined not to have arisen when information showing nonoccurrence of said capture error is received a second predetermined number of times.

6. The method for controlling an identification point for binarization in an optical signal receiver according to claim 4, wherein, in said capture error determination step, said capture error is determined to have arisen when information showing occurrence of said capture error is received a first predetermined number of times from said demodulation processing section; and said capture error is determined not to have arisen when information showing nonoccurrence of said capture error is received a second predetermined number of times.

7. The method for controlling an identification point for binarization in an optical signal receiver according to claim 5, wherein said increment/decrement range is held in the maximum range by said electrical signal output from said photoelectric conversion section, until the number of times information showing nonoccurrence of said capture error is received reaches a second predetermined number of times in said capture error determination step.

8. The method for controlling an identification point for binarization in an optical signal receiver according to claim 6, wherein said increment/decrement range is held in the maximum range by said electrical signal output from said photoelectric conversion section, until the number of times information showing nonoccurrence of said capture error is received reaches a second predetermined number of times in said capture error determination step.

9. The method for controlling an identification point for binarizationin an optical signal receiver according to claim 1, wherein control of said identification point for binarization is stopped on the basis of an external alarm signal.

10. The method for controlling an identification point for binarization in an optical signal receiver according to claim 2, wherein control of said identification point for binarization is stopped on the basis of an external alarm signal.

11. The method for controlling an identification point for binarization in an optical signal receiver according to claim 3, wherein control of said identification point for binarization is stopped on the basis of an external alarm signal.

12. The method for controlling an identification point for binarization in an optical signal receiver according to claim 4, wherein control of said identification point for binarization is stopped on the basis of an external alarm signal.

13. The method for controlling an identification point for binarization in an optical signal receiver according to claim 5, wherein control of said identification point for binarization is stopped on the basis of an external alarm signal.

14. The method for controlling an identification point for binarization in an optical signal receiver according to claim 6, wherein control of said identification point for binarization is stopped on the basis of an external alarm signal.

15. The method for controlling an identification point for binarization in an optical signal receiver according to claim 7, wherein control of said identification point for binarization is stopped on the basis of an external alarm signal.

16. The method for controlling an identification point for binarization in an optical signal receiver according to claim 8, wherein control of said identification point for binarization is stopped on the basis of an external alarm signal.

17. An optical signal receiver comprising:

a photoelectric conversion section which receives an optical signal into which a data signal is modulated with a frame format and converts the optical signal into an analog electric signal corresponding to the intensity of the optical signal;

a binarization processing section which compares the analog electric signal output from the photoelectric conversion section with a predetermined identification point electric voltage, to thus output the analog electric signal as binarized digital data;

a demodulation processing section for demodulating, from the digital data output from the binarization processing section, frame information into which an optical signal received by the photoelectric conversion section is modulated, by means of performing frame capture operations and error correction operations; and a tracking control section which receives an input of information about a frame capture error output from said demodulation processing section and an input of information about the number of times said error correction operation is performed, controls tracking of said identification point voltage in said binarization processing section and curtails an increment/decrement range for incrementing or decrementing said identification point electrical signal when said capture error has arisen.

18. A method for controlling an identification point for binarization in an optical signal receiver, the receiver including a photoelectric conversion section which receives an optical signal into which a data signal is modulated with a frame format and converts the optical signal into an electric signal corresponding to the intensity of the optical signal, a binarization processing section which compares the electric signal output from the photoelectric conversion section with a predetermined identification point electric signal, to thus output the electric signal as binarized digital data, and a demodulation processing section for demodulating, from the digital data output from the binarization processing section, frame information into which an optical signal received by the photoelectric conversion section is modulated, by means of performing frame capture operations and error correction operations, the method comprising:

acquiring the number of error correction operations performed by said demodulation processing section;

determining whether or not a capture error has arisen during the frame capture operations performed by said demodulation processing section;

determining whether or not the number of error correction operations performed by said demodulation processing section has reached a target value when said capture error is determined not to have arisen;

leaving said identification point electrical signal unchanged when said number of error correction operations is determined to have reached a target value but incrementing or decrementing said identification point electrical signal within a predetermined increment/decrement range in such a way that said number of error correction operations approaches said target value when said number of error correction operations is determined not to have reached said target value; and curtailing an increment/decrement range for incrementing or decrementing said identification point electrical signal when said capture error has arisen.

* * * * *

UNITED STATES PATENT AND TRADEMARK OFFICE
CERTIFICATE OF CORRECTION

PATENT NO. : 7,319,824 B2
APPLICATION NO. : 11/152332
DATED : January 15, 2008
INVENTOR(S) : Katsumi Fukumitsu It is certified that error appears in the above-identified patent and that said Letters Patent is hereby corrected as shown below:

Col. 20, line 7, delete "binarizationin" and insert --binarization in--, therefor.

Signed and Sealed this

Second Day of September, 2008

JON W. DUDAS
*Director of the United States Patent and Trademark Office*